United States Patent
Stover et al.

(10) Patent No.: US 6,732,201 B2
(45) Date of Patent: May 4, 2004

(54) HARDWARE SPEED SELECTION BEHIND A DISK ARRAY CONTROLLER

(75) Inventors: Jeremy D. Stover, Wichita, KS (US); Jason M. Stuhlsatz, Wichita, KS (US)

(73) Assignee: LSI Logic Corporation, Milpitas, CA (US)

(*) Notice: Subject to any disclaimer, the term of this patent is extended or adjusted under 35 U.S.C. 154(b) by 170 days.

(21) Appl. No.: 10/023,101

(22) Filed: Dec. 17, 2001

(65) Prior Publication Data

US 2003/0115387 A1 Jun. 19, 2003

(51) Int. Cl.[7] ................................................. G06F 3/00
(52) U.S. Cl. ................... 710/60; 710/316; 710/306; 710/1
(58) Field of Search ....................... 710/316, 306, 710/1, 8–10, 311–315; 711/100–114; 714/718, 710; 369/30.68–30.83; 360/737

(56) References Cited

U.S. PATENT DOCUMENTS

| | | | | |
|---|---|---|---|---|
| 5,022,030 A | * | 6/1991 | Haugh | 714/805 |
| 5,617,425 A | * | 4/1997 | Anderson | 714/710 |
| 5,729,552 A | * | 3/1998 | Yorimitsu | 714/718 |
| 5,812,754 A | * | 9/1998 | Lui et al. | 714/6 |
| 5,875,460 A | * | 2/1999 | Kojima et al. | 711/114 |
| 5,991,891 A | * | 11/1999 | Hahn et al. | 714/4 |
| 6,058,454 A | * | 5/2000 | Gerlach et al. | 711/114 |
| 6,148,414 A | * | 11/2000 | Brown et al. | 714/9 |
| 6,401,170 B1 | * | 6/2002 | Griffith et al. | 711/114 |
| 6,425,049 B1 | * | 7/2002 | Yamamoto et al. | 711/112 |
| 6,430,714 B1 | * | 8/2002 | McAdam et al. | 714/704 |
| 6,574,753 B1 | * | 6/2003 | Haynes et al. | 714/43 |
| 6,615,314 B1 | * | 9/2003 | Higaki et al. | 711/114 |

FOREIGN PATENT DOCUMENTS

WO    WO9926150    * 5/1999

* cited by examiner

*Primary Examiner*—Christopher B. Shin
(74) *Attorney, Agent, or Firm*—Suiter West PC LLO

(57) ABSTRACT

A system has a plurality of enclosures. Each enclosure has two enclosure services modules. Each enclosure services module has an IN port and an EXPANSION port. Each enclosure services module is able to determine the data rate of incoming data and check the validity of this data. If the data rate is other than what the enclosure services module is set for, the data rate of the enclosure services module is changed to that of the incoming data. In the system, there are a disk array controller having a first channel and a second channel. The first channel is formed in sequence from a disk array controller to a first enclosure services module of a first enclosure and between first enclosure services modules of successive enclosures to a last enclosure. The second channel is formed in reverse sequence from the disk array controller to the second enclosure services module of the last enclosure and between second enclosure services modules of successive enclosures to the first enclosure.

20 Claims, 2 Drawing Sheets

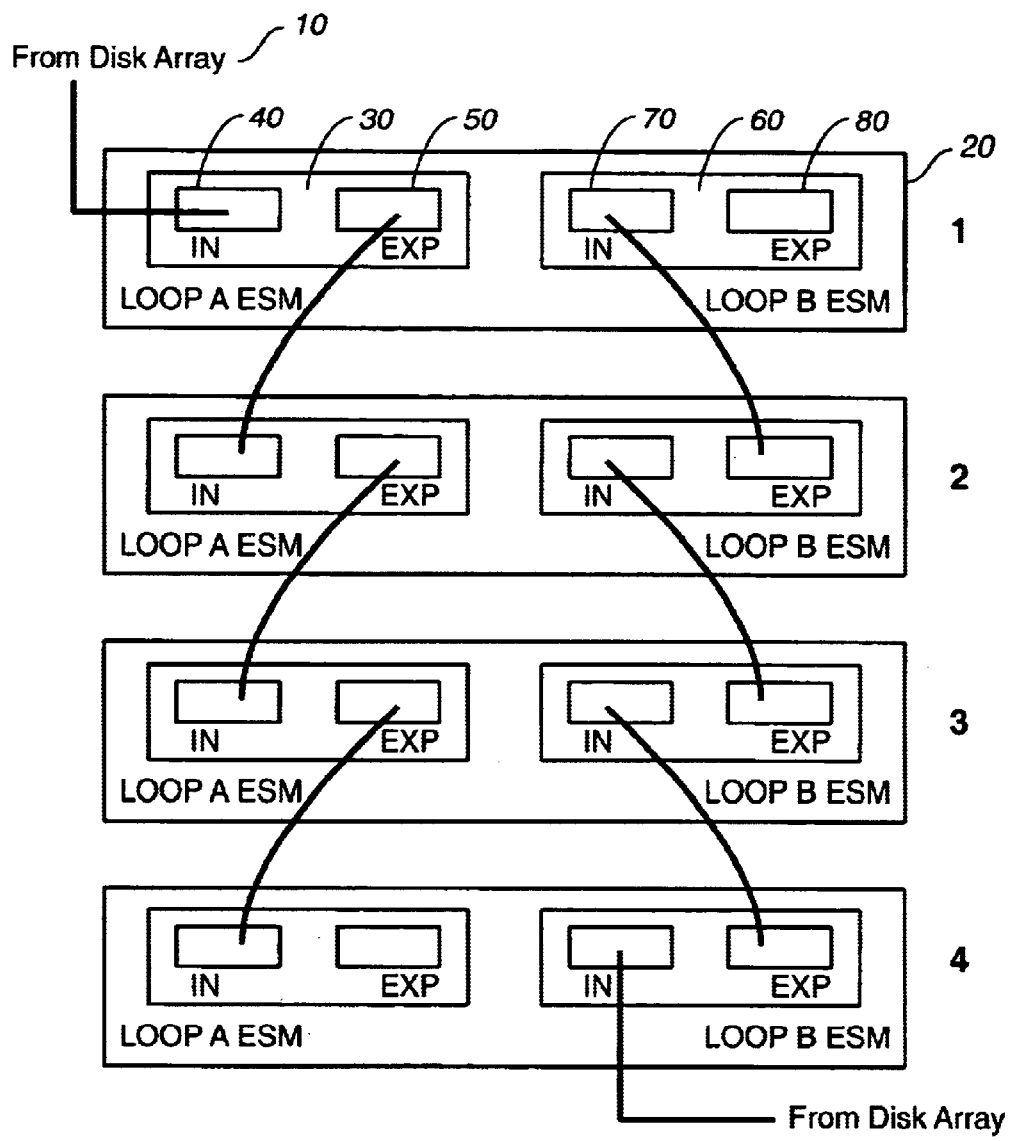
FIG._1

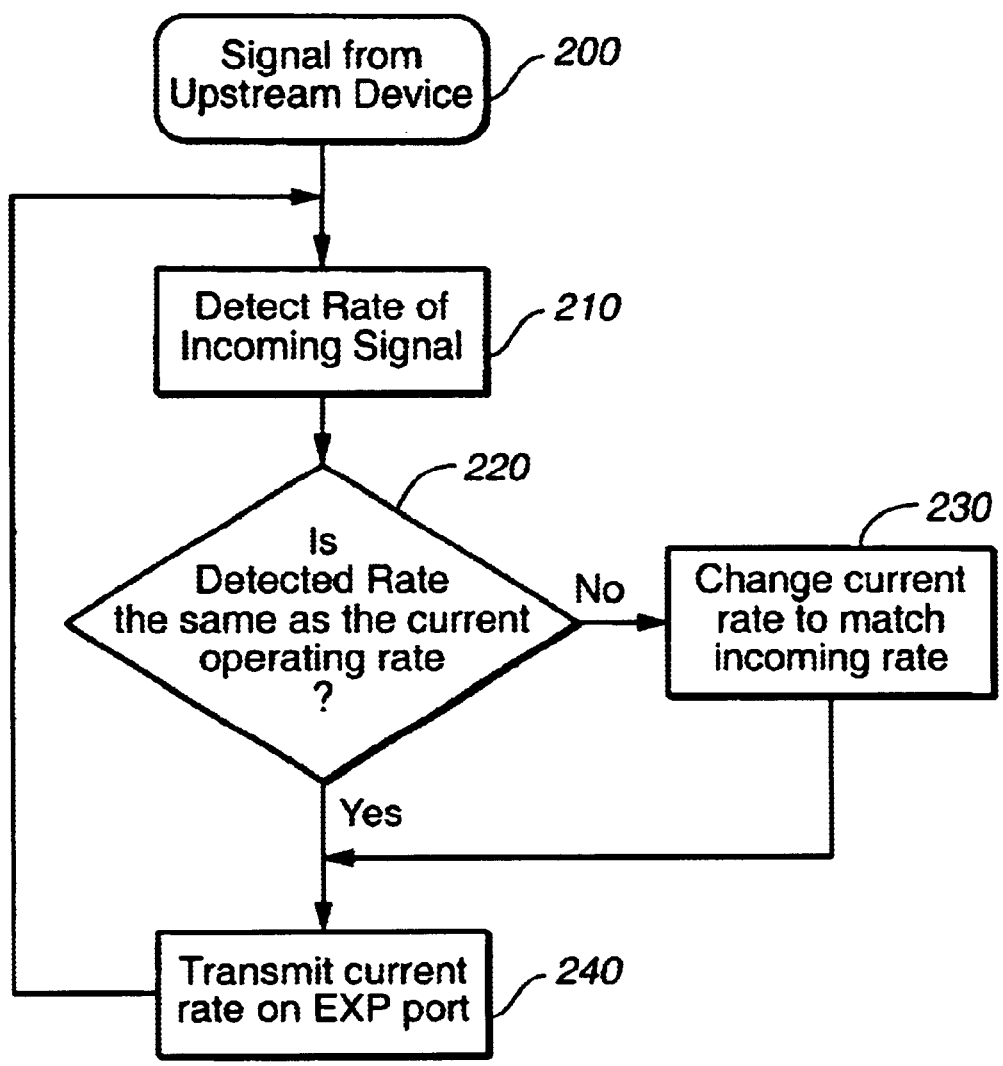
FIG._2

HARDWARE SPEED SELECTION BEHIND A DISK ARRAY CONTROLLER

FIELD OF THE INVENTION

The present invention generally relates to the field of data communications storage, and particularly to a method and apparatus for hardware speed selection behind a disk array controller for disk drive enclosures which use Fibre Channel Arbitrated Loop (FC-AL) interfaces.

BACKGROUND OF THE INVENTION

Fibre Channel (FC) is a serial data communication network architecture and protocol for interconnecting computers and peripheral devices. Fibre Channel supports several protocols, including the Small Computer System Interface (SCSI) protocol, an ANSI standard for controlling peripheral devices by one or more host computers. The computer or peripheral devices are connected to the network through fibre channel ports or other means. Because of the high bandwidth and connection flexibility it offers, fibre channel is often used for connecting peripheral devices within multi-disk drive enclosures, such as redundant arrays of inexpensive disks (RAIDs), and for connecting multi-disk drive enclosures with one or more host computers.

There are three topologies of Fibre Channel: Point-to-Point, Arbitrated Loop, and Fabric. Fibre Channel Arbitrated Loop refers to the ANSI FC-AL document which specifies the Arbitrated Loop topology and is a shared architecture. Fibre Channel currently runs at 1 Gb or 2 Gb and may, in the future, run at 4 Gb or 10 Gb. Arbitrated Loop has become the most dominant Fibre Channel topology, but it is also the most complex. It offers a cost-effective way of connecting up to 127 ports in a single network.

Multi-disk drive enclosures offer good economy, good storage capacity, and redundancy that improve operational reliability; however, malfunctioning enclosures can, in certain cases, degrade or disable communications. In the prior art, enclosure services modules only detected that the drive was not communicating properly. Speed selection was based on a standard that was only defined to support point to point (limit 2 devices) configurations. It was also protocol intensive.

Therefore, it would be desirable to provide a method and system for changing disk drive operating speeds for a large group of drives behind a disk array controller without manual user intervention.

SUMMARY OF THE INVENTION

Accordingly, the present invention is directed to an apparatus having disk drives which are physically organized into multiple enclosures and a method for detecting and changing the data rates of the disk drives without manual user intervention.

In a first aspect of the present invention, a method is disclosed for adjusting the speed of operation of a first channel or loop for communicating with disk drives in a multi ported system organized into a plurality of enclosures and having a first channel connected in sequence from a disk array controller to a first enclosure services module and successively connected to successive first enclosure services modules to a last enclosure, including the step of detecting by a device associated with a corresponding first one of the plurality of enclosure services modules the data rate of incoming data from the disk array controller.

In a second aspect of the present invention, a system is disclosed for adjusting the speed of operation of a channel for communicating with disk drives in a multi ported system. The system includes a disk array controller having a first channel and a second channel and a plurality of first and second enclosure services modules. The first channel is formed in sequence from a disk array controller to a first enclosure services module of a first enclosure and between first enclosure services modules of successive enclosures to a last enclosure. Each one of the plurality of enclosure services modules has a port bypass device which makes a data rate determination of incoming data.

In a third aspect, a system for adjusting the speed of operation of a channel for communicating with disk drives in a multi ported system is disclosed. This system has a disk array controller having a first channel and a second channel and a plurality of enclosure services modules. The first channel is formed in sequence from a disk array controller to a first enclosure services module of a first enclosure and between first enclosure services modules of a successive enclosures to the last enclosure. The second channel is formed in reverse sequence from the disk array controller to the second enclosure services module of the last enclosure and between second enclosure services modules of successive enclosures to the first enclosure. This system operates according to the method having the steps of identifying the enclosure to receive the incoming data and, for the proper enclosure, detecting by a device the data rate of incoming data from the disk array controller, comparing the data rate of the incoming data with the current data of the enclosure services module, changing the data rate of the enclosure services module to that of the data rate of the incoming data, and checking the validity of the incoming data.

In a fourth aspect of the present invention, a system is disclosed for passing a signal to a chain of electrically connected devices having two channels. This system has a controller device and a plurality of subservient devices, each subservient device being able to determine the data rate of incoming data. The controller device is connected both in an open chain manner to the subservient devices in a forward order and in a physically separate reverse order. The controller device is a disk array controller and the subservient devices are enclosure services modules for disk drives.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 1 illustrates a system diagram; and

FIG. 2 illustrates a flowchart of the steps taken in detecting and changing the disk rate of the enclosures.

DETAILED DESCRIPTION OF THE INVENTION

The present invention relates to a system and method to allow multiple drive enclosures on a loop behind a disk array controller to dynamically change loop speed; in particular, the system and method relate to changing between 1 and 2 Gbit data rates based on the desired operating speed transmitted from the array controller.

Reference will now be made in detail to the presently preferred embodiments of the invention, examples of which are illustrated in the accompanying drawings.

Referring generally now to FIGS. 1 through 2, exemplary embodiments of the present invention are shown.

Fibre Channel is a serial data communication network architecture and protocol for computers, workstations, and peripheral devices. In Fibre Channel, data is transferred one bit at a time at extremely high transfer rates. The Fibre Channel port includes serial transmitter and receiver components coupled to a communications medium via a link that has wires made of a signal transmitting material. It could be metal wire, optical fiber, or some other transmissive material.

A physical layout of an enclosure partitioned disk drive system is shown in FIG. 1. Each enclosure has two enclosure services modules and its drives constitute the enclosure. The disk array controller is a target controller that uses the channel to connect to the peripheral device. Disk array controllers are commonly used in RAID arrays.

Behind the cable port on each of the drive enclosures, there is a port bypass device that monitors the data that is being received and that decides whether to include the external connection into its internal loop or not based on data validity. The port bypass device prevents a down node from bringing down an entire loop in FC-AL. The port bypass device is a switch that allows a node or ESM to be bypassed and electronically removed from the loop without interrupting traffic or adversely affecting data integrity on the loop. When all the enclosures are operating at the same speed, the enclosures are "chained" together into a large loop. If an enclosure is receiving data that is not at the same rate that it is configured for, it will bypass the port since this is seen as invalid receive data.

This invention defines a specific IN port and a specific EXPANSION (EXP) port. The port bypass device that is monitoring the input to the IN port also indicates the currently detected data rate being received to logic inside the drive enclosure. If it does not match the current enclosure speed, the data detection logic in the bypass device is changed to the received data speed to check for data validity at the detected receive speed. If valid data is received at the new rate on the IN port of the enclosure, then the logic inside the enclosure would reconfigure the devices in the enclosure to run at the new speed and unbypass the IN port. At this time, the enclosure would begin transmitting the new link speed from its EXP port and the next enclosure services module in the chain would begin the process to change speeds.

The enclosures are connected sequentially such that the second and subsequent enclosures in the chain only see the data that the first enclosure recognizes as valid and passes through. The port bypass terminology is referenced to the enclosure, not the loop. This means that for the second enclosure to get data from the disk array, it must pass through the first enclosure. Therefore, the first enclosure must be set to the same speed as the controller and the second enclosure or it cannot pass the data through. Each enclosure dynamically configures itself to operate at the data rate that it is receiving on its IN port and begins transmitting data out of its EXP port at that rate. This data is seen at the IN port of the next enclosure causing it to match its speed. In this manner, the new speed that was originally transmitted by the RAID controller cascades through the drive enclosures until all the enclosures are at the same speed and a complete loop including all the enclosures is re-established.

In the method of the present invention, if the array is always connected to an IN port on the drive enclosure, it is guaranteed to be in the "control position", meaning that it is always the initiator of the speed change and the logic allows the change to cascade through the enclosure services modules.

FIG. 1 illustrates an embodiment of a system according to the present invention. The disk array controller 10 is connected by cable to the IN port 40 of ESM Loop A 30 (first enclosure services module) of enclosure 1 through which signals of the first channel pass through the EXP port 50 to the corresponding IN port 40 of enclosure 2. The EXP port of ESM Loop A of enclosure 2, in turn, is connected to the IN port of ESM Loop A of third enclosure 3. The connections are made in such a manner until all the enclosures are connected to each other to form the first channel.

The electrical connections are made, in reverse order, for the second channel. In this case, the disk array controller is connected first to IN port 70 of ESM Loop B 60 of the last enclosure 4 which was connected to the first channel. Then, the IN port 70 of the next to the last enclosure 3 is connected to the EXP port 80 of ESM Loop B 60 of the last enclosure 4. The connection of the IN ports to EXP ports continues for successive enclosures.

This is done in reverse order so that if a problem arises in the middle of the path of one loop (channel), a portion of the enclosures may be accessible through Loop A and the other portion from Loop B. For instance, if enclosure 3 in FIG. 1 were powered off, it would not be able to pass signals from the disk array to enclosure 4 on Loop A. In this case, the disk array would use Loop A to communicate with enclosures 1 and 2 and Loop B to communicate with enclosure 4.

A multi-speed algorithm relies on each enclosure's port bypass device to detect the speed of the incoming data. The port bypass device compares the detected data rate with the incoming data rate. The enclosure services module of the enclosure is responsible for changing the speeds of all of its drives when it determines the speed of the incoming data. Driving the speed control pins to the new speed value does this. The drive is responsible for recognizing, on the fly, that the speed has changed.

FIG. 2 illustrates the steps which occur in processing data by each enclosure services module of a channel. This algorithm works for just a single channel from the disk array controller to the enclosure services modules. For improved reliability, two channels are used in the exemplary embodiment. The second channel may be used as an alternate path for fault tolerance or for load balancing of data transactions.

FIG. 2 illustrates the process steps in making a drive enclosure speed change. The disk array controller 10 transmits signals at a first data rate to the first enclosure, either enclosure 1 or enclosure 4 of FIG. 1, step 200. The choice of the first enclosure accessed depends upon which channel is used. The ESM in the first enclosure detects the rate of the incoming signal and reconfigures itself to operate at the same rate, if necessary. If the incoming rate is different from the current rate, it begins to transmit the new rate from its EXP port to the IN port of the next enclosure. This causes the next enclosure to change to the new rate by the same process until the last enclosure is reached and all the enclosures are at the same rate. Once all of the enclosures are at the same rate, data transfer may begin to any device on that loop.

Alternatively, the first ESM encountered in a channel may determine the data rate of the incoming data and transmit that data rate to the next ESM. Each ESM may evaluate the data rate of incoming data.

Although the present method has been described in terms of transferring data to an enclosure, a similar process would be used in transferring the data from an enclosure. In one embodiment, the disk array controller may send a data transfer command along with an enclosure identification command and other relevant identification information to retrieve data from the disk drives. Current implementations require a switch to be set on each drive enclosure to change the operating rate of the enclosure. This invention allows the loop rate to be altered without manual intervention at any of the drive enclosures which may be remotely located from the disk array controller.

The advantage of this approach is that the change is done in a controlled manner in integrating a fibre channel solution in which the control of some behavior is distributed across the components. The present invention provides a method for setting up a loop or channel to allow data transfer to occur on it. Once the loop is initialized and set to the correct rate, all devices may communicate on the loop in both directions at that speed per the FC-AL standard.

It is believed that the hardware speed selection behind a disk array controller of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method for adjusting a speed of operation of a first channel for communicating with disk drives in a multi ported system organized into a plurality of enclosures having a first channel formed in sequence from a disk array controller to a first enclosure services module of a first enclosure and between first enclosure services modules of successive enclosures until and including a last enclosure, comprising:

detecting by a device associated with a corresponding first one of the plurality of enclosure services modules a data rate of incoming data from the disk array controller, comparing the data rate of the incoming data with a current data rate in the first one of the plurality of enclosure services modules, and changing the current data rate of the first one of the plurality of enclosure services modules to that of the data rate of the incoming data.

2. The method of claim 1, further comprising a second channel formed in reverse sequence from the disk array controller to the second enclosure services module of the last enclosure and between second enclosure services modules of successive enclosures to the first enclosure.

3. The method of claim 2, wherein each of the plurality of enclosure services modules is defined by an IN port and an EXPANSION port.

4. The method of claim 2, wherein the enclosures include disk drives.

5. The method of claim 4, wherein the disk drives are Fibre Channel disk drives.

6. The method of claim 5, wherein the disk drives recognize, on the fly that a speed has been changed.

7. The method of claim 1, wherein the device is in bypass mode.

8. The method of claim 7, further comprising checking the validity of the incoming data.

9. The method of claim 8, if the incoming data is determined to be valid, further comprising placing the device in unbypass mode and accepting the incoming data.

10. The method of claim 8, if the incoming data is determined not to be valid, further comprising maintaining the device in bypass mode and not accepting the incoming data.

11. A system for adjusting a speed of operation of a channel for communicating with disk drives in a multi ported system, comprising:

a disk array controller having a first channel; and a plurality of enclosures, each having an enclosure services module from which the first channel is formed in sequence from a disk array controller to a first enclosure services module of a first enclosure and between first enclosure services modules of successive enclosures to a last enclosure, each one of the plurality of enclosure services modules having a port bypass device which makes a data rate determination of incoming data, wherein the date rate determination includes detecting by a device associated with each one of the plurality of enclosure services modules the data rate of incoming data from the disk array controller, comparing the data rate of the incoming data with the current data rate in each one of the plurality of enclosure services modules, and changing the current data rate of each one of the plurality of enclosure services modules to that of the data rate of the incoming data.

12. The system of claim 11, wherein a second channel is formed in reverse sequence from the disk array controller and the second enclosure services module of the last enclosure and between second enclosure services modules of successive enclosures to the first enclosure.

13. The system of claim 12, wherein the each of the first and second channels is bi-directional.

14. The system of claim 11, wherein the enclosures include disk drives which are Fibre Channel disk drives.

15. The system of claim 11, wherein the enclosure services modules each have a microprocessor.

16. A system for adjusting a speed of operation of a channel for communicating with disk drives in a multi ported system, comprising:

a disk array controller having a first channel and a second channel; and a plurality of enclosures, each enclosure having first and second enclosure services modules, a first channel being formed in sequence from a disk array controller to a first enclosure services module of a first enclosure and between first enclosure services modules of successive enclosures to a last enclosure and a second channel being formed in reverse sequence from the disk array controller to a second enclosure services module of the last enclosure and between second enclosure modules of successive enclosures to the first enclosure, the system operating according to the method comprising:

detecting by a device associated with a corresponding first one of the plurality of enclosure services modules the data rate of incoming data from the disk array controller;

comparing the data rate of the incoming data with a current data rate in the corresponding first one of the plurality of enclosure services modules;

changing the current data rate of the enclosure services module to that of the data rate of the corresponding first one of the plurality of enclosure services modules; and checking the validity of the incoming data.

17. A system for passing a signal to a chain of electrically connected devices having two channels, comprising:

a controller device; and a plurality of subservient devices, each subservient device being able to determine a data rate of incoming data, wherein the controller device is connected both in an open chain manner to the subservient devices in a forward order and in a physically separate reverse order.

18. The system of claim 17, wherein the forward connection and the reverse connection define the two channels.

19. The system of claim 17, wherein the controller device is a disk array controller and the subservient devices are enclosures having enclosure services modules for disk drives.

20. The system of claim 17, the system operating according to the method comprising:

detecting, by a device associated with one of the subservient devices, the data rate of incoming data;

comparing the data rate of the incoming data with a current data rate in the corresponding one of the subservient devices, the data rate of incoming data;

changing the current data rate of the one of the subservient devices to the data rate of incoming data; and checking the validity of the incoming data.

* * * * *